United States Patent [19]

Tricot et al.

[11] 4,339,337

[45] Jul. 13, 1982

[54] PROCESS FOR THE PREPARATION OF MAGNETIC BEADS OF VINYLAROMATIC POLYMERS

[75] Inventors: Marc Tricot, Andilly; Jean-Claude Daniel, Fontenay sous Bois, both of France

[73] Assignee: Rhone-Poulenc Industries, Paris, France

[21] Appl. No.: 178,465

[22] Filed: Aug. 15, 1980

[30] Foreign Application Priority Data

Aug. 24, 1979 [FR] France .................... 79 21342
Jun. 27, 1980 [FR] France .................... 80 14309

[51] Int. Cl.³ .................... H01F 1/00; H01F 1/28; C08J 3/00
[52] U.S. Cl. .................... 252/62.54; 252/62.53; 430/137; 524/431
[58] Field of Search .............. 252/62.52, 62.53, 62.54; 430/137; 260/42.53

[56] References Cited

U.S. PATENT DOCUMENTS

| 3,042,616 | 7/1962 | Brown | 252/62.53 |
| 4,108,786 | 8/1978 | Takayama | 252/62.53 X |
| 4,157,323 | 6/1979 | Yen et al. | 260/29.7 M |
| 4,264,700 | 4/1981 | Bayley | 430/137 |

FOREIGN PATENT DOCUMENTS

36-2596 4/1961 Japan .
47-43199 10/1972 Japan .
52-94389 8/1977 Japan .

*Primary Examiner*—F. Edmundson
*Attorney, Agent, or Firm*—McDougall, Hersh & Scott

[57] ABSTRACT

Process for the preparation of magnetic beads of vinylaromatic polymers, which comprises dispersing a magnetic filler in a solution of a homo- or co-polymer in a vinylaromatic compound alone or in mixture with a co-polymerizable monomer, putting the resulting dispersion into suspension in water and polymerizing the monomer or monomers, and use of said magnetic beads in the paints, inks, reprography and in biology.

14 Claims, No Drawings

PROCESS FOR THE PREPARATION OF MAGNETIC BEADS OF VINYLAROMATIC POLYMERS

The invention concerns a process for the preparation of magnetic beads of vinylaromatic polymers by polymerization in suspension.

Magnetic polymers, in the form of gels or particles, are substances which are coming into general use in many fields, such as reprography, paints, inks, eletrophotography, ion-exchangers, and biological molecule carriers, particularly for immuno-enzymatic dosing processes.

Such magnetic polymers are generally produced by mixing the magnetic filler with the polymer prepared by conventional methods of bulk, solution, emulsion or suspension polymerization. However, the mixing operation is a supplementary stage in the preparation of the magnetic polymers, like for example atomization, coagulation, extrusion and solvent distillation, which requires a suitable apparatus and the consumption of substantial amounts of energy; which often gives rise to difficulties in regard to dispersion, and which results in polymers, in the form of non-uniform particles, which suffer from defects in respect of distribution of the magnetic filler and the properties of which can be altered.

In order to avoid such mixtures, it has been proposed that the magnetic filler be added to the medium for polymerization of water-soluble monomers, but in that case, the products formed are hydrophilic polymers which are of limited use.

In regard to water-insoluble monomers, it is known that dispersing the magnetic filler in the monomer, before the monomer is suspended in water and polymerized, does not give satisfactory results because migration of the filler in the aqueous phase occurs in the course of polymerization.

The process of this invention avoids these disadvantages and makes it possible readily to produce beads of polymers containing a magnetic filler, which retain all their physical and magnetic properties and do not suffer from alteration in the course of use thereof.

The process for producing magnetic beads of vinylaromatic polymers comprises effecting polymerization in suspension of a vinylaromatic compound alone or in mixture with a copolymerizable monomer in the presence of an initiator, a suspension agent and a magnetic filler, and is characterized in that the magnetic filler is dispersed in a solution of at least one water-insoluble homo- or copolymer in the monomer or monomers, then the resulting dispersion is suspended in water and the monomer or monomers is or are polymerized.

The solution of water-insoluble homo- or co-polymer in the monomer or monomers, which constitutes the organic phase, is obtained:

either by partial bulk polymerization of the monomer or monomers in the presence of an initiator;

or by dissolving, in all or part of the monomer or monomers to be polymerized, at least one polymer which is soluble in the monomer or monomers to be polymerized and insoluble in water. This second possible way of producing the organic phase, being more readily capable of reproduction than the first way, is a preferred form of the invention.

Depending on the nature of the polymer and its concentration in the organic phase, which is less than 60% by weight and preferably less than 45% by weight, it is possible to vary the viscosity of the organic phase. This makes it possible to control the granulometry of the polymer beads to be produced, in per se known manner and, depending on the size and the amount of the magnetic filler, to produce a regular dispersion of said filler in the beads.

In order to achieve homogeneous dispersion of the magnetic filler in the organic phase, the filler is added either to the monomer before partial bulk polymerisation or to the agitated organic phase which is obtained after partial polymerisation or by dissolution of polymer(s) in the monomer or monomers. The dispersion is then put into suspension by the addition, in one or more operations, of water containing one or more suspension agents or, conversely, by adding the dispersion to the aqueous phase. The amount of water used is such that the ratio by weight between the organic phase containing the filler, and the aqueous phase, is from 0.1 to 0.5.

The monomer or monomers is or are then polymerised using any known methods for the suspension polymerisation of vinylaromatic compounds at temperatures of from 30° to 150° C. and preferably from 50° to 130° C.

The vinylaromatic compounds used in the process of the invention are represented by styrene, alpha-methylstyrene, ethylstyrene, tertio-butylstyrene and vinyltoluene. They are used alone or in mixture with each other, or in mixtures containing at least 20% by weight of said compound and one or more monomers which are co-polymerisable with the compound, to give a copolymer which is soluble in the monomers. The following may be mentioned as co-polymerisable monomers: vinyl compounds such as: $C_{1-10}$alkyl acrylates and methacrylates acrylo- and methacrylo-nitriles; $C_{1-C8}$ alkyl esters of ethylenic acids having 4 or 5 carbon atoms, such as: heptylfumarate, octylfumarate, methylitaconate and ethylitaconate.

Depending on the reaction conditions, it is possible to add a cross-linking monomer such as for example divinylbenzene, vinylmethacrylate, mono- or polyethyleneglycol diacrylate or dimethacrylate, esters of acrylic and methacrylic acids and polyols such as pentaerythritol or trimethylolpropane triacrylates or trimethacrylates, in proportions of from 0 t 10% by weight of the monomer or monomers. It is also possible to add a chain-limiting agent such as the dimerof alpha-methylstyrene, branched or straight chain alkylmercaptans, or halogenated hydrocarbons, in proportions from 0 to 5% by weight with respect to the monomer or monomers.

The reference to polymers which are soluble in the monomer or monomers to be polymerised and insoluble in water means homo- and co-polymers of vinylaromatic compounds, as defined hereinbefore; homopolymers of vinyl monomers such as $C_1$–$C_{10}$ alkylacrylates and methacrylates, acrylo- and methacryl-nitriles and copolymers of said vinyl monomers with each other or with $C_{1-8}$ alkyl esters of $C_{4-5}$ ethylene acids; the polycondensates of polyols with one or more unsaturated polycarboxylic anhydrides or acids and possibly one or more saturated polycarboxylic anhydrides or acids.

The magnetic filler is in the form of particles which are sufficiently fine that they can be included in the polymer beads, that is to say, they are generally from 0.005 to 10 μm in size. The filler is represented more particularly by:

metals such as: iron, ferosilicon, nickel, cobalt or alloys of each of said metals with molybdenum, chromium, copper, vanadium, manganese, aluminium or titanium;

iron oxides: $Fe_3O_4$ or $\gamma$-$Fe_2O_3$ in pure form or in combination or mixture with other oxides such as oxides of cobalt, manganese, zinc, barium or rare earths;

chromium dioxide.

The magnetic particles, alone or in mixture, are dispersed in the whole or part of the organic phase, either as they are or in the form of colloidal suspension of the particles in an organic medium which is compatible with the organic phase. The organic medium is selected from hydrocarbons which may or may not be halogenated, organic esters and polyphenylethers.

The amount of magnetic filler to be used is from 0.2 to 50% by weight of the organic phase and preferably from 0.5 to 20%.

The initiators used in the process, in an amount of from 0.02 to 3% by weight with respect to the monomer or monomers, are selected from conventional organo-soluble initiators for the radical polymerisation of vinylaromatic compounds such as peroxides and azonitriles represented in particular by peroxides of benzoyl, dicumyl, ditertiobutyl, diacetyl, lauroyl, methylethylketone, caprylyl, 2,4-dichlorobenzoyl and parachlorobenzoyl, tertiobutylperbenzoate, diethylperacetate and perpivalate, ditertiobutyldiperphthalate, 1,1-ditertiobutyl-peroxy-3,3,5-trimethylcyclohexane, azobisisobutyronitrile and azobiscyclohexane carbonitrile.

One or more initiators may be used, being introduced into the reaction medium in mixture or successively; successive introduction operations are particularly suitable to the case where bulk polymerisation is carried out in the first stage of the process. The initiator or initiators selected depends on the polymerisation temperature.

The suspension agents which ensure that the organic phase is kept in suspension in the aqueous phase and which influence the size of the bads to be produced, are those which are generally employed in the polymerisation of vinylaromatic compounds. They are represented by organic and inorganic protective colloids, possibly in association with surface-active agents.

The following may be mentioned as examples of organic colloids: polyvinylalcohol, polyvinylpyrrolidone, maleic anhydride-styrene copolymers, sulphonated polystyrenes, polyglycol ethers, gelatin and alkyl and hydroxyalkyl celluloses; while the following may be mentioned as examples of inorganic colloids: calcium and magnesium carbonates, barium sulphate, zinc and aluminium oxides, and phosphates of magnesium, barium, and more particularly tricalcium. These organic or inorganic colloids are used alone or in mixure in proportions of from 0.05 to 5% by weight with respect to the organic phase.

At least one surface active agent can be associated with the colloid or colloids, in an amount of from 5 to 50 ppm by weight with respect to the organic phase. They are selected more particularly from alkaline salts of fatty acids, alkylsulphuric acids or alkylarylsulphonic acids, such as: sodium stearate, sodium oleate, sodium laurylsulphate and sodium dodecylbenzenesulphonate.

The protective colloid or colloids and possibly the surface active agent or agents is or are introduced either together or separately, generally in the aqueous phase, before polymerisation. However, in some cases, it may be advantageous for them to be introduced either in the course of polmerisation, in successive fractions or continuously, or with a part being introduced before polymerisation, the other part being introduced in the course of polymerisation, in successive fractions or continuously.

Although not absolutely necessary, it may be advantageous for a pH-value regulator, such as for example disodium phosphate, to be added to the polymerization suspension.

After polymerization, the beads formed are separated, washed with water and/or with a water-miscible liquid which is not a solvent in respect of the polymer, such as for example an alcohol, such as methanol or ethanol and/or an aqueous solution of inorganic acid, and finally dried.

The polymers of the vinylaromatic compounds produced in accordance with the process of the invention are in the form of magnetic beads of mean size of from 0.05 to 3 mm and preferably from 0.1 to 2 mm.

The beads are easily attracted by a magnet, which, in certain uses, makes it possible for them to be separated from the ambient liquid medium. In addition, they may bemodified by any chemical reactions in order to give, inter alia, ion exchangers.

The magnetic polymer beads may be used in paints and inks, in reprography, and in biology, in particular as biological molecule carriers.

Examples of the invention are given hereinafter by way of non-limiting example.

In the examples:

the viscosity of the polymers used is determined by the flow in a capillary tube of the 10% by weight solution of the polymer (30% in Example 13) in toluene at a temperature of 25° C.;

the viscosity of the solution of polymer in the monomer is measured by means of a Brookfield viscosimeter at a speed of 50 rpm, with needles and temperatures adapted to each solution.

EXAMPLE 1

The following are introduced into a 0.5 liter reaction vessel provided with an agitator:

70 g of distilled styrene 0.07 g of $\alpha$-methylstyrene dimer 0.07 g of tertiobutyl perbenzoate 2.2 g of a 16% by weight dispersion in a mineral oil of $Fe_3O_4$ wherein the size of the particles is about 0.01 $\mu$m.

The mixture, being agitated, is heated to 90° C. When it reaches that temperature, 0.2 g of benzoyl peroxide is added, and then the mixture is maintained at a temperature of 90° C. for 2 hours.

163 g of deionised water at a temperature of 90° C. is then introduced into the reaction vessel, followed, a minute later, by 2.33 g of hydroxyapatite and 0.47 ml of a 0.5% by weight aqueous solution of sodium dodecylbenzenesulphonate. The agitated mixture is maintained at a temperature of 90° C. for 20 hours.

After cooling to ambient temperature, 0.2 ml of a 38% by weight aqueous solution of hydrochloric acid is added, and then the beads formed are separated by settling and filtration. After washing with methanol and drying at a temperature of 30° C., 65 g of beads which are of reddish brown colour and which have a mean diameter of 1 mm are produced.

Beads in suspension in water are easily separated from the medium by attraction along the walls of the vessel, by means of a magnet.

EXAMPLE 2

The following are introduced into a 4 liter reaction vessel provided with an agitator:

560 g of distilled styrene, and
21 g of a 16% by weight dispersion in a mineral oil of $Fe_3O_4$, wherein the size of the particles is about 0.01 μm.

The mixture, with agitation, is heated to 75° C. After 30 minutes at that temperature, 4.75 g of benzoyl peroxide is added and the mixture is polymerised at 75° C. for 2 hours 30 minutes.

The result is a homogeneous and viscous mixture, which is maintained at a temperature of 75° C., while there is added thereto a solution comprising 2615 g of deionised water, 9.6 g of disodium phosphate and 3.92 g of polyvinyl alcohol. The resulting dispersion, being agitated, is heated to a temperature of 90° C., which temperture is maintained for 10 hours.

After cooling, the beads formed are filtered, washed with water and then with methanol, dried at ambient temperature and sieved.

552 g of beads of magnetic polystyrene, which are brown in colour, is produced. The beads have the following granulometric distribution:

<0.25 mm: 10% by weight
from 0.25 to 0.50 mm: 78% by weight
from 0.50 to 1 mm: 12% by weight

EXAMPLE 3

The following are introduced into a 0.5 liter reaction vessel provided with an agitator:

62.7 g of a 35% by weight solution in distilled styrene, of a polystyrene whose viscosity is 41 mPa.S. The Brookfield viscosity of the solution at a temperature of 20° C. with needle No. 7, is 23600 mPa.S.
4 g of a dispersion in a 20% by weight solution of the same polystyrene as above, in distilled styrene, of magnetic iron oxide ($Fe_2O_3$+FeO) in powder form measuring from 0.5 to 5 μm, in a proportion of 24.6% by weight with respect to the solution. The Brookfield viscosity of the solution at a temperature of 20.7° C., with needle No. 3, is 830 mPa.S.
0.86 g of benzoyl peroxide.

To the resulting mixture, with agitation, there is added 310g of an aqueous solution containing 0.4 g of polyvinyl alcohol and 1.113 g of disodium phosphate. The resulting dispersion is heated at a temperature of 90° C., with agitation. After 4 hours at that temperature, 50.8 g of a solution containing 0.03 g of polyvinyl alcohol is added. The reaction mixture is kept under agitation and at a temperature of 90° C. for a period of 6 hours.

After cooling, the product formed is filtered, washed with water and with methanol, and then dried at ambient temperature.

57.5 g of dark grey beads is produced. The beads are from 0.5 to 2 mm in diameter, contain 0.8% by weight of magnetic filler and are attracted by a magnet.

EXAMPLE 4

The following are introduced into a 4 liter reaction vessel produced with an agitator:

560 g of a 30% solution in styrene or polystyrene whose viscosity is 41 mPa.S. The Brookfield viscosity of the solution, at a temperature of 19° C., needle No. 6, is 8500 mPa.S.
21 g of a 16% by weight dispersion in a mineral oil of $Fe_3O_4$ wherein the size of the particles is about 0.01 μm.
3.33 g of benzoyl peroxide.

The agitated mixture is homogeneous after 30 minutes. Added thereto is 2472 g of an aqueous solution containing 3.1 g of polyvinyl alcohol and 9.6 g of disodium phosphate. The resulting dispersion is heated to a temperature of 90° C. After being at that temperature for 4 hours, 406 g of an aqueous solution containing 0.3 g of polyvinyl alcohol is added, and then the suspension is kept under agitation, at a temperature of 90° C., for a period of 6 hours.

After cooling, the product formed is filtered, washed with water and with methanol and then dried at ambient temperature.

531.5 g of brown beads is produced. The beads can be attracted by a magnet and have the following granulometric distribution:

<0.25 mm: 8.1% by weight
from 0.25 to 0.50 mm: 57.7% by weight
from 0.50 to 1 mm: 30.4% by weight
from 1 to 2 mm: 2.3% by weight
>2 mm: 1.5% by weight

EXAMPLE 5

The following are introduced into a 4 liter reaction vessel provided with an agitator:

240 g of a 10% by weight solution in distilled styrene, of a polystyrene with a viscosity of 41 mPa.S. The Brookfield viscosity of the solution at a temperature of 19.5° C., needle No. 1, is 76 mPa.S.
320 g of the same polystyrene solution wherein there is dispersed 16.8 g of needles of $\gamma$-$Fe_2O_3$ which are from 0.2 to 1 μm in length.

The mixture is agitated for 30 minutes, 3.73 g of benzoyl peroxide is then added, followed by 2858 g of an aqueous solution containing 9.6 g of disodium phosphate and 2.52 g of polyvinyl alcohol. The dispersion is then heated to a temperature of 90° C. and then maintained at that temperature for a period of 10 hours.

After cooling, the product formed is filtered, washed with water and then dried at a temperature of 60° C.

530 g of brown beads is produced. The granulometric distribution of the beads is as follows:

<0.20 mm: 7.1% by weight
from 0.20 to 0.40 mm: 80.6% by weight
>0.40 mm: 12.3% by weight.

The fraction which is 0.20 to 0.40 mm in size contains 1.5% by weight of $Fe_2O_3$. The beads can be attracted by a magnet.

EXAMPLE 6

Example 5 is repeated, with the 16.8 g of needles of $\gamma$-$Fe_2O_3$ being replaced by 16.8 g of iron in the form of fine powder of from 3 to 5 μm in size.

494 g of light grey beads is produced, with the following granulometric distribution:

<0.25 mm: 11% by weight
from 0.25to 0.50 mm: 88.5% by weight
>0.50 mm: 0.5% by weight The fraction which is from 0.25 to 0.50 mm in size contains 1.4% by weight of magnetic filler. The beads can be attracted by a magnet.

EXAMPLE 7

Operation is as in Example 5, with the following components:

400 g of the same polystyrene solution as in Example 5
160 g of the same polystyrene solution wherein 11.2 g of $\gamma$-Fe$_2$O$_3$ needles which are from 0.2 to 1 $\mu$m in length has been dispersed by agitation
3.73 g of benzoyl peroxide
2967 g of an aqueous solution containing 9.6 g of disodium phosphate and 2.52 g of polyvinyl alcohol.

538 g of brown beads is produced, with the following granulometric distribution:

<0.20 mm: 4.3% by weight
from 0.20 to 0.40 mm: 85.1% by weight
from 0.40 to 1 mm: 10.4% by weight
>1 mm: 0.2% by weight The portion which is from 0.20 to 0.40 mm in size contains 1.5% by weight of magnetic filler. The beads in suspension can be attracted by a magnet.

EXAMPLE 8

560 g of distilled styrene containing in solution 10% by weight of polystyrene with a viscosity of 41 mPa.S is introduced into a 4 liter reaction vessel provided with an agitator. The Brookfield viscosity at a temperature of 19.5° C., needle No. 1, is 76 mPa.S.

56 g of $\gamma$-Fe$_2$O$_3$ needles which are from 0.2 to 1 $\mu$m in length is added to the solution. The agitated dispersion is maintained at ambient temperature for 1 hour, with the addition of 3.73 g of benzoyl peroxide, after 30 minutes.

2858 g of an aqueous solution containing 9.6 g of disodium phosphate and 2.52 g of polyvinyl alcohol is then added; the dispersion is then heated to a temperature of 90° C. and maintained at that temperature for a period of 10 hours.

After cooling, the product formed is filtered, washed with water and finally dried at 60° C.

547 g of beads which are brown in colour is produced. The granulometric distribution thereof is as follows:

<0.25 mm: 17.7% by weight
from 0.25 to 0.50 mm: 78.3% by weight
>0.50 mm: 4% by weight The fraction which is from 0.25 to 0.50 mm in size contains 2.7% by weight of Fe$_2$O$_3$. The beads can be attracted by a magnet.

EXAMPLE 9

Example 8 is repeated, with the following components:

560 g of a solution formed by 64% by weight of distilled styrene, 16% by weight of methyl methacrylate, and 20% by weight of polystyrene with a viscosity of 41 mPa.S. The Brookfield viscosity of the solution at a temperature of 20° C., needle No 4, is 765 mPa.S.
11.2 g of $\gamma$-Fe$_2$O$_3$ from 0.2 to 1 $\mu$m in length
3.73 g of benzoyl peroxide
2859 g of an aqueous solution containing 9.6 g of disodium phosphate and 2.52 g of polyvinyl alcohol.

507 g of brown beads is produced, with the following granulometric distribution:

<0.20 mm: 0.4% by weight
from 0.20 to 0.40 mm: 3% by weight
from 0.40 to 1 mm: 92% by weight
>1 mm: 4.6% by weight The fraction which is from 0.40 to 1 mm in size contains 0.9% by weight of Fe$_2$O$_3$. The beads can be attracted by a magnet.

EXAMPLE 10

Example 8 is repeated, with the following components:

560 g of a homogeneous solution formed by 87.3% by weight of distilled styrene, 2.7% by weight of divinylbenzene and 10% by weight of polystyrene with a viscosity of 41 mPa.S. The Brookfield viscosity of the solution at a temperature of 20° C., needle No 1, is 75 mPa.S.
16.8 g of $\gamma$-Fe$_2$O$_3$ of from 0.2 to 1 $\mu$m in length
3.68 g of benzoyl peroxide
2855 g of an aqueous solution containing 9.6 g of disodium phosphate and 2.52 g of polyvinyl alcohol.

530 g of brown beads is produced, with the following granulometric distribution:

<0.20 mm: 4% by weight
from 0.20 to 0.40 mm: 90.4% by weight
from 0.40 to 1 mm: 4.9% by weight
>1 mm: 0.7% by weight The fraction which is from 0.20 to 0.40 mm in size contains 1.1% by weight of Fe$_2$O$_3$. The beads can be attracted by a magnet.

EXAMPLE 11

Example 8 is repeated with the following components:

560 g of a solution formed by distilled vinyl toluene containing 11.1% by weight of polystyrene with a viscosity of 41 mPa.S. The Brookfield viscosity of the solution at a temperature of 20° C., needle No 1, is 133 mPa.S.
16.8 g of $\gamma$-Fe$_2$O$_3$ needles of from 0.1 to 1 $\mu$m in length
3.68 g of benzoyl peroxide
2862 g of an aqueous solution containing 9.6 g of disodium phosphate and 2.52 g of polyvinyl alcohol.

555 g of brown beads is produced, with the following granulometric distribution:

<0.20 mm: 2.6% by weight
from 0.20 to 0.40 mm: 33.3% by weight
from 0.40 to 0.50 mm: 47.7% by weight
from 0.50 to 1 mm: 16.4% by weight The fraction which is from 0.20 to 0.40 mm in size contains 0.9% by weight of Fe$_2$O$_3$. The beads can be attracted by a magnet.

EXAMPLE 12

Example 8 is repeated, with the following components:

560 g of a 7% by weight homogeneous solution in distilled styrene, of propylene glycol fumarophthalate with a molecular weight of about 1500. The Brookfield viscosity of the solution at a temperature of 20° C., needle No 1, is 10 mPa.S.
16.8 g of $\gamma$-$Fe_2O_3$ needles of from 0.2 to 1 $\mu$m in length
3.85 g of benzoyl peroxide
2815 g of an aqueous solution containing 9.6 g of disodium phosphate and 0.32 g of polyvinyl alcohol.

543 g of brown beads is produced, which contains 2.3% by weight of $Fe_2O_3$. The beads can be attracted by a magnet.

EXAMPLE 13

The following are introduced into a 4 liter reaction vessel provided with an agitator:

240 g of a 5% by weight solution in distilled styrene, of polymethylmethacrylate with a viscosity of 500 mPa.S (measured on a 30% by weight solution of the polymer in toluene at 25° C.). The Brookfield viscosity of the solution at 20° C., needle No 1, is 13 mPa.S.
320 g of the same solution of polymethylmethacrylate, wherein 16.8 g of $\gamma$-$Fe_2O_3$ needles of from 0.2 to 1 $\mu$m in length is dispersed.

To the agitated mixture there are then added 4.97 g of benzoyl peroxide followed by 2862 g of an aqueous solution containing 9.6 g of disodium phosphate and 2.52 g of polyvinyl alcohol. The dispersion is then heated to 90° C. and then maintained at that temperature for a period of 10 hours.

After cooling, the product formed is filtered, washed with water and dried at a temperature of 60° C.

533 g of brown beads is produced, with the following granulometric distribution:

<0.20 mm: 14.9% by weight
from 0.20 to 0.40 mm: 78.5% by weight
from 0.40 to 0.50 mm: 4.7% by weight
from 0.50 to 1 mm: 1.4% by weight
>1 mm: 0.6% by weight.

The fraction which is from 0.20 to 0.40 mm in size contains 1.4% by weight of $Fe_2O_3$. The beads can be attracted by a magnet.

We claim:

1. A process for the preparation of magnetic beads of vinylaromatic polymers in which vinylaromatic monomers alone or in admixture with a copolymerizable monomer is polymerized in the presence of an initiator, a suspension agent and a magnetic filler comprising dispersing the magnetic filler in an organic phase in the form of a solution of at least one water insoluble homo- or co-polymer in the monomer(s), suspending the dispersion in aqueous medium, and then polymerizing the monomer(s) while still containing the homo- or co-polymer dissolved therein.

2. A process according to claim 1 characterized in that the organic phase which comprises the solution of homo- or co-polymer in the monomer or monomers is produced by partial bulk polymerization of the monomer or monomers in the presence of an initiator.

3. A process according to claim 1 characterized in that the organic phase which comprises the solution of homo- or co-polymer in the monomer or monomers is produced by dissolving, in all or part of the monomer or monomers to be polymerized, at least one polymer which is soluble in the monomer or monomers to be polymerized and insoluble in water.

4. A process according to claim 1 characterized in that the concentration of polymer in the organic phase is less than 60% by weight.

5. A process according to claim 1 characterized in that the vinylaromatic monomers are selected from the group consisting of styrene, alphamethylstyrene, ethylstyrene, tertio-butylstyrene and vinyltoluene.

6. A process according to claim 1 characterized in that the copolymerizable monomers are vinyl compounds or alkyl esters of ethylenic acids.

7. A process according to claim 1 which includes a cross-linking monomer in proportions of from 0 to 10% by weight with respect to the monomer or monomers.

8. A process according to claim 1 which includes a chain-limiting agent in proportions of from 0 to 5% by weight with respect to the monomer or monomers.

9. A process according to claim 3 characterized in that the polymers which are soluble in the monomer or monomers and insoluble in water are selected from the group consisting of homo- and co-polymers of vinylaromatic compounds; homo-polymers of vinyl monomers or copolymers of said monomers with each other or with alkyl esters of ethylenic acids; and polycondensates of polyols and unsaturated polycarboxylic anhydrides or acids.

10. A process according to claim 1 in which the magnetic filler is selected from the group consisting of metals or alloys thereof, pure iron oxides, in combination or in mixture, and chromium dioxide.

11. A process according to claim 1 characterized in that the size of the particles of magnetic filler is from 0.005 to 10 $\mu$m.

12. A process according to claim 1 characterized in that the amount of magnetic filler is from 0.2 to 50% by weight of the organic phase.

13. A process according to claim 1 characterized in that the ratio by weight of the organic phase containing the magnetic filler to the aqueous phase is from 0.1 to 0.5.

14. Vinylaromatic polymers produced by the process of claim 1, in the form of magnetic beads of mean size of from 0.05 to 3 mm.

* * * * *